(12) United States Patent
Mathison (10) Patent No.: US 7,191,808 B2
(45) Date of Patent: Mar. 20, 2007

(54) DRIVER INTERACTIVE SYSTEM FOR REDUCING THE POSSIBILITY OF A STATIC DISCHARGE DURING THE REFILL OF HIGH PRESSURE STORAGE TANKS IN HYDROGEN FUEL CELL POWERED VEHICLES

(75) Inventor: Steven R. Mathison, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 115 days.

(21) Appl. No.: 11/148,480

(22) Filed: Jun. 9, 2005

(65) Prior Publication Data

US 2006/0278303 A1  Dec. 14, 2006

(51) Int. Cl.
*B65B 1/04* (2006.01)

(52) U.S. Cl. .......................... 141/94; 361/212; 361/217

(58) Field of Classification Search ................ 141/94, 141/67, 192, 83, 98; 361/212, 216, 217
See application file for complete search history.

(56) References Cited

U.S. PATENT DOCUMENTS

| | | | | |
|---|---|---|---|---|
| 5,159,523 A * | 10/1992 | Claassen et al. | ............ | 361/215 |
| 6,401,767 B1 * | 6/2002 | Cohen et al. | .................. | 141/1 |
| 6,418,985 B2 * | 7/2002 | Aguilar | ........................ | 141/98 |
| 6,683,779 B2 * | 1/2004 | Ober | ........................... | 361/220 |
| 7,013,930 B2 * | 3/2006 | Mann | ............................. | 141/1 |

* cited by examiner

*Primary Examiner*—Steven O. Douglas
(74) *Attorney, Agent, or Firm*—Mark F. Duell, Esq.; Porter Wright Morris & Arthur LLP (57) ABSTRACT

A driver interactive system to indirectly monitor hydrogen fuel cell vehicle electrical charge potential through vehicle to ground resistance measurements, and to permit refueling only when vehicle to ground resistance does not exceed a predetermined safe level thereby reducing the possibility of a static discharge during the refill of high pressure storage tanks in hydrogen powered vehicles.

14 Claims, 8 Drawing Sheets

*Figure 3C*

DRIVER INTERACTIVE SYSTEM FOR REDUCING THE POSSIBILITY OF A STATIC DISCHARGE DURING THE REFILL OF HIGH PRESSURE STORAGE TANKS IN HYDROGEN FUEL CELL POWERED VEHICLES

FIELD OF THE INVENTION

The present invention relates to a system for eliminating the possibility of a static discharge during the refill of high pressure storage tanks in hydrogen fuel cell powered vehicles. In the system, vehicle and refill station charge potential is monitored indirectly through resistance measurements and refueling is permitted only when resistance values do not exceed a predetermined safety level.

BACKGROUND OF THE INVENTION

When hydrogen is used as a fuel in motor vehicles, a hydrogen fuel depot infrastructure for refueling must also be developed. Typically, present practice is that fuel is stored in on board tanks maintained at a maximum pressure in the range of about 5000 psi for hydrogen. Higher pressures in the range of about 10,000 psi or more are likely to be utilized as the use of hydrogen becomes more widespread. During driving, a static charge can build up on the vehicle chassis. When the vehicle stops, the charge is usually dissipated to ground through the vehicle's tires; however, the rate of dissipation of the charge through the vehicle tires varies depending on the resistance of the tires and the resistance of the surface on which the vehicle is parked or stopped. If, at a refueling station or depot, the vehicle static charge energy is above a minimum threshold energy level that can cause the ignition of hydrogen gas, then it is not safe to refuel the vehicle through the refill conduit connecting the fuel depot gas outlet and the vehicle tank inlet. If hydrogen were to leak at the depot refill nozzle or at the vehicle receptacle, a spark may occur when the refill nozzle is connected to the vehicle receptacle, which could potentially ignite the hydrogen. A conventional solution mitigates the static discharge problem, by connecting a grounding cable to the vehicle before refueling to avoid the potential for a spark to occur.

OBJECTS OF THE INVENTION

It is an object of the present invention to monitor vehicle to earth ground resistance and to permit refueling only when this resistance value does not exceed a predetermined safety level. In this manner, the possibility of a static discharge during the refill of high pressure storage tanks in hydrogen fuel cell powered vehicles is eliminated. The cumbersome and time consuming physical connection of a grounding cable to the vehicle is eliminated.

SUMMARY OF THE INVENTION

The invention provides an interactive system that eliminates the need for a grounding cable connection to the vehicle when refueling a hydrogen powered vehicle. The invention utilizes a method that ensures that the static charge dissipates to a safe level before refueling occurs by minimizing the resistance of the refueling surface and by measuring the resistance between vehicle and ground to verify that the resistance is below a threshold value before refueling can occur. In the invention, a conductive tire contact surface is directly connected to ground at the vehicle refueling depot; the position of the vehicle on the conductive surface is monitored to ensure that the vehicle is positioned correctly on the conductive surface before and during the refill mode; the resistance between the vehicle and ground is measured to ensure that the vehicle/ground resistance is below a predetermined threshold safety value; and a signal is communicated to the vehicle driver when the vehicle is positioned correctly, and when the resistance has been measured, indicating that all preconditions for the elimination of the possibility of an electric discharge are met and that it is safe to refuel the vehicle.

The invention is described more fully in the following description of the preferred embodiment considered in view of the drawings in which:

DETAILED DESCRIPTION OF THE INVENTION

The invention indirectly monitors vehicle charge potential by measuring vehicle to ground resistance and permits refueling only when this resistance does not exceed a predetermined safety level and provides a driver interactive mechanism by which refill is permitted only under a safe condition whereby the possibility of a static discharge during the refill of high pressure storage tanks in hydrogen fuel cell powered vehicles is eliminated. In an interactive system that eliminates the need for a grounding cable from the vehicle when refueling a hydrogen powered vehicle, the invention utilizes a method that ensures that the static charge of a vehicle dissipates to a safe level before refueling by minimizing the resistance of the vehicle/refueling surface on which the vehicle is positioned. The system of the invention measures the resistance between vehicle and ground to verify that the resistance is below a threshold value before refueling can occur. A conductive tire contact surface is directly connected to ground at the vehicle refueling depot; the position of the vehicle on the conductive surface is monitored to ensure that the vehicle is positioned correctly on the conductive surface before and during the refill mode; the resistance between the vehicle and ground is measured to ensure that the vehicle/ground resistance is below a predetermined threshold safety value; and a signal is communicated to the vehicle driver when the vehicle is positioned correctly, and when a safe resistance level is verified, indicating that all preconditions for the elimination of the possibility of an electric discharge are met and that it is safe to refuel the vehicle.

Figure 1A:
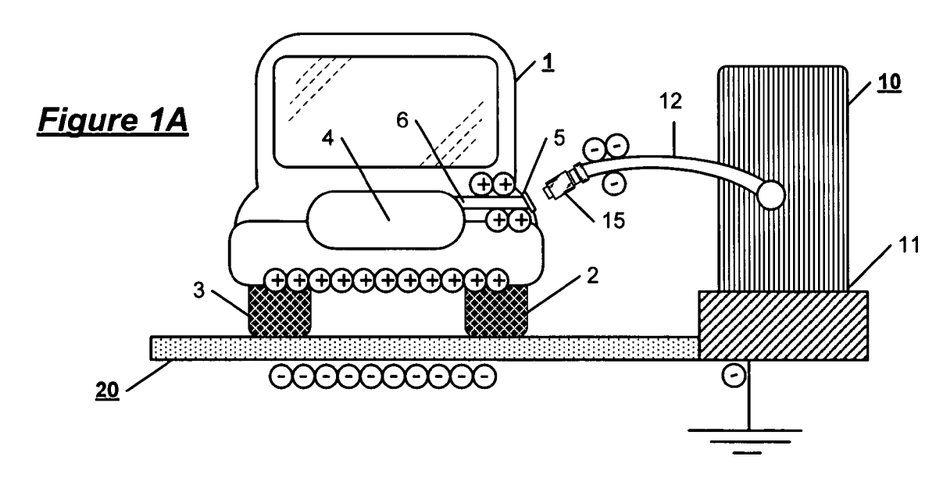
FIG. 1A is a diagram showing typical static potential between the vehicle, the fuel depot and ground at a refueling station.
Figure 1B:
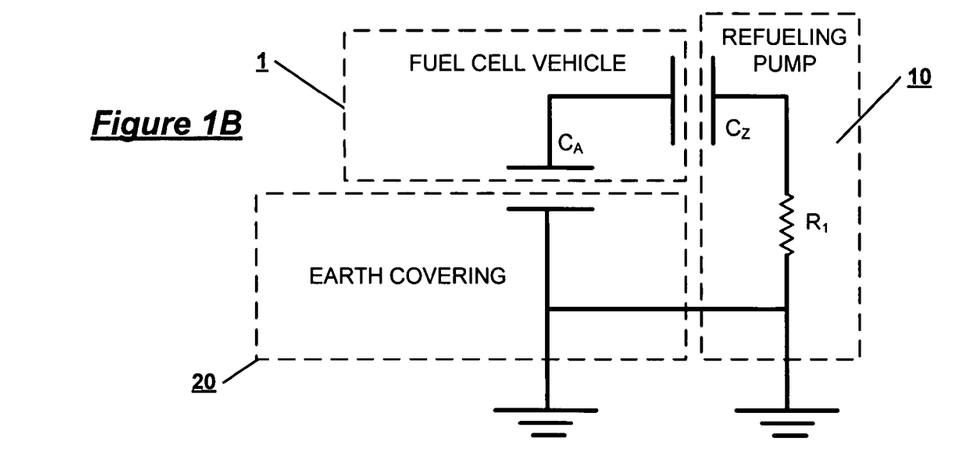
FIG. 1B is a schematic diagram showing the electrical resistance and capacitance of the vehicle, earth and refueling pump circuit equivalent to the representation of FIG. 1A.
Figure 1C:
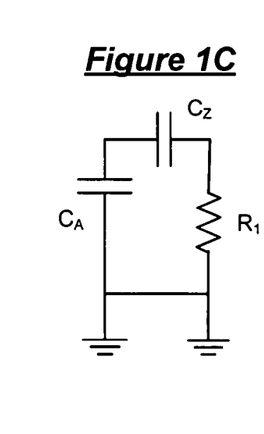
FIG. 1C is a purely electrical representation of the circuit of FIG. 1B.

FIG. 1A is a diagram showing typical static potential between the vehicle, the fuel depot and ground at a refueling station. In FIG. 1A, the rear of the vehicle is shown as 1 having right rear tire 2 and left rear tire 3. Hydrogen gas fuel tank 4 is interconnected through fuel conduit 6 to gas tank inlet 5. Ground [earth] is shown at 20. Refuel depot pump 10 is installed on base 11 and includes conduit 12 and nozzle 15 for interconnection with the fuel tank inlet 5. Electrical charges in the ambient vehicle/fuel depot environment are respectively shown as positive, +, and negative, –. FIG. 1B shows the equivalent electrical circuit wherein $C_A$ indicates capacitance between fuel cell vehicle 1 and earth 20 and $C_Z$ indicates capacitance between fuel cell vehicle 1 and refueling pump 10 and earth 20. $R_1$ indicates resistance between refueling pump 10. and ground or earth. As shown in FIG. 1A and FIG. 1B, a static charge builds up on the vehicle chassis during driving. When the vehicle stops, the rate of dissipation of the charge through the vehicle tires varies depending on the resistance of the tires and the resistance of the surface on which the vehicle is parked or stopped. If, at a refueling station or depot, the vehicle static charge potential stored in the capacitor elements, $C_A$ and $C_Z$ of the circuit is above a minimum threshold energy level, a spark may occur that can cause the ignition of hydrogen gas. See FIG. 1C.

EXAMPLE A

Figure 2A:
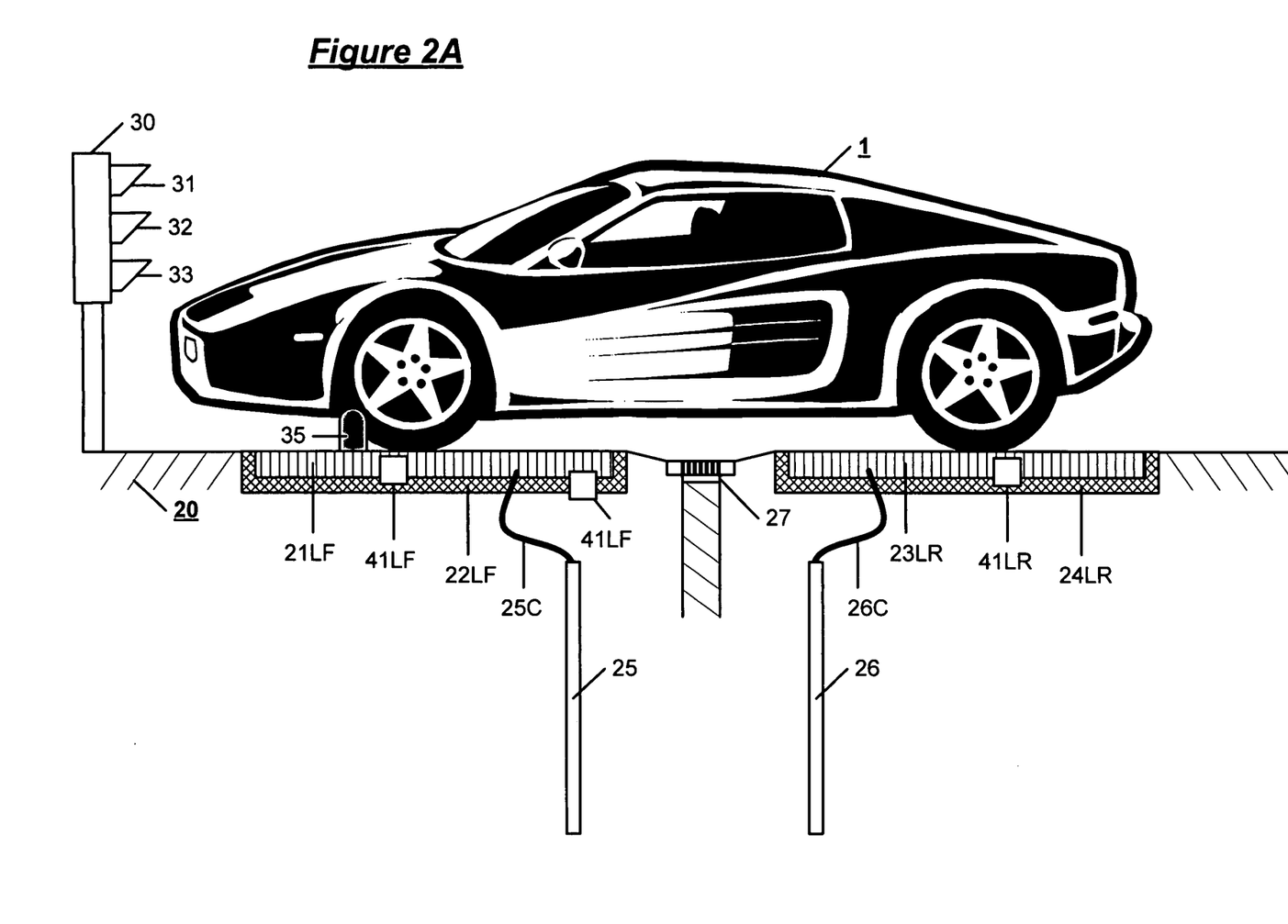
FIG. 2A is a side view of one embodiment of the invention showing a vehicle positioned on conductive pads at a refuel depot and a signal to the driver for directing refuel operations.

FIG. 2A is a side view of one embodiment of the invention showing vehicle 1 with the driver's side [left] shown positioned on conductive pads or grates 21LF and 23LR at a refuel depot wherein ground or station platform is shown as 20. The signal 30 to the driver for directing refuel operations includes a series of differently colored lights, or text signals, for example: red light 31 indicating "STOP CAR;" blue light 32 showing "OK TO FILL," and green light 33 indicating "FILL IS FINISHED." Conductive pads 21LF and 23LR are encased on the bottom and sides by an insulating media 22LF and 24LR isolating the pads from ground 20. Grounding rods 25 and 26 ensure a direct ground connection from the pads through switchable circuits 25C and 26C which are interconnected with a control means. Water drain 27 eliminates most extraneous water from the system; and proximity sensor 35 verifies correct positioning of the vehicle on the pads which also include load cells 41LF and 42LR at the pads.

Figure 2B:
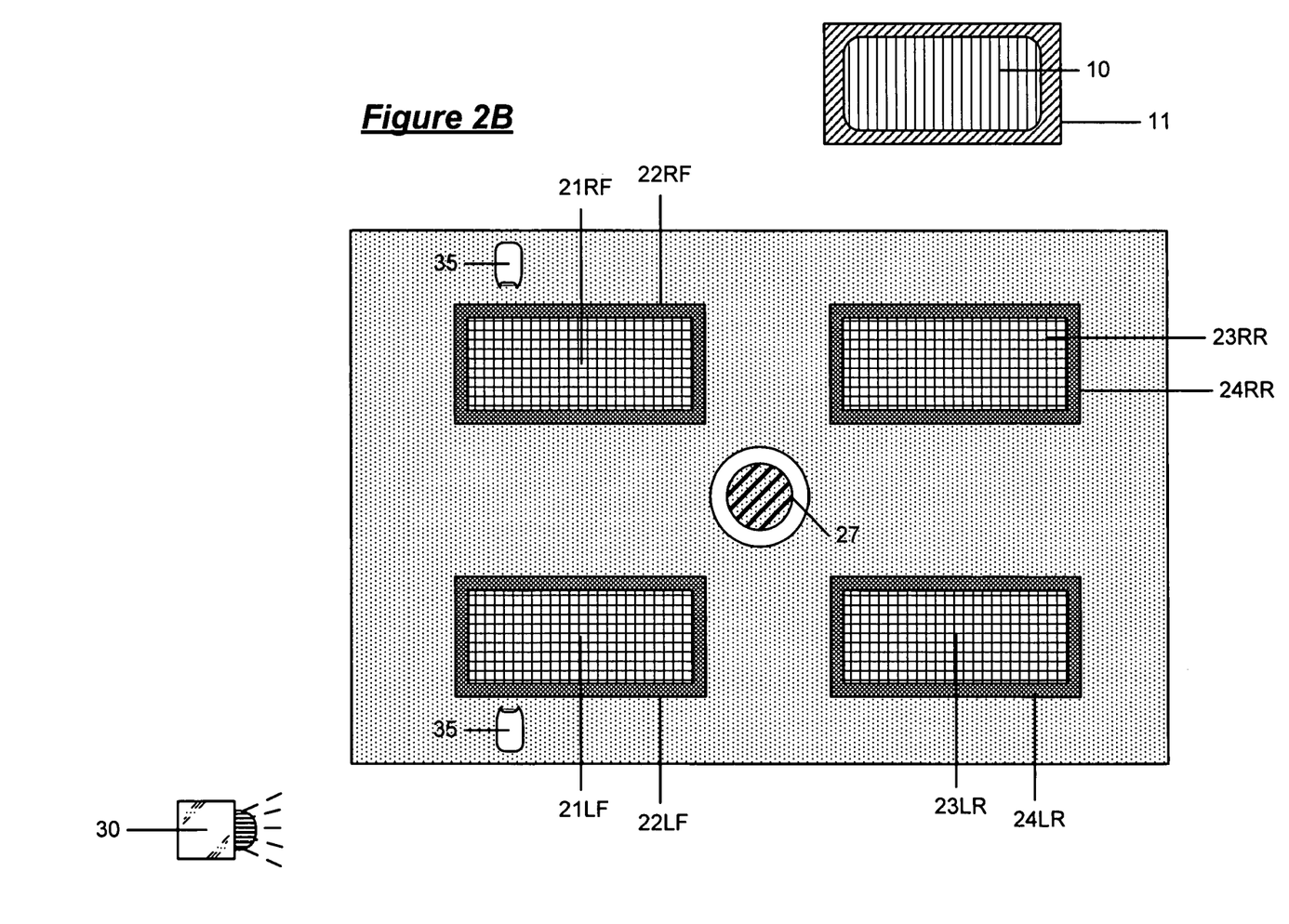
FIG. 2B is a plan view of the embodiment of FIG. 2A.

FIG. 2B is a plan view of the embodiment of FIG. 2A wherein the configuration of pads and isolative media on the right side of the vehicle 21RF, 22RR, 23RF, and 24RR is a symmetrical image of the left side shown in FIG. 2A. Drain 27, proximity sensors 35, and refill pump 10 and platform 11 are also shown. Each pad may have its own grounding rod or multiple pads may utilize the same ground connection.

Figure 2C:
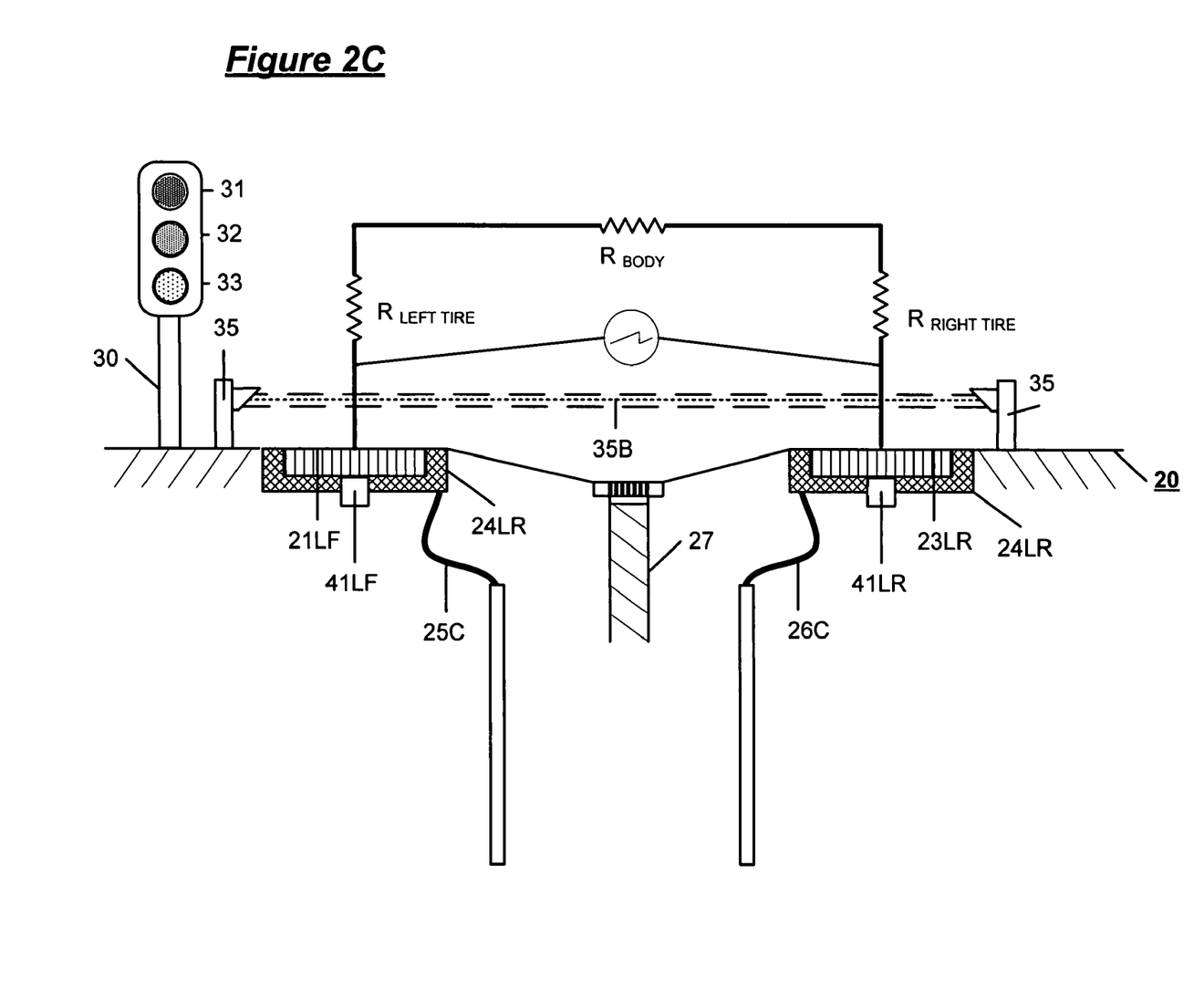
FIG. 2C is a cross section view of the embodiment of FIG. 2A showing operation of the resistance monitoring system when a vehicle is positioned correctly on the conductive pads.

FIG. 2C is a cross section view of the embodiment of FIG. 2A at the front of a vehicle showing operation of the resistance monitoring system when a vehicle is positioned correctly on the conductive pads.

Figure 4:
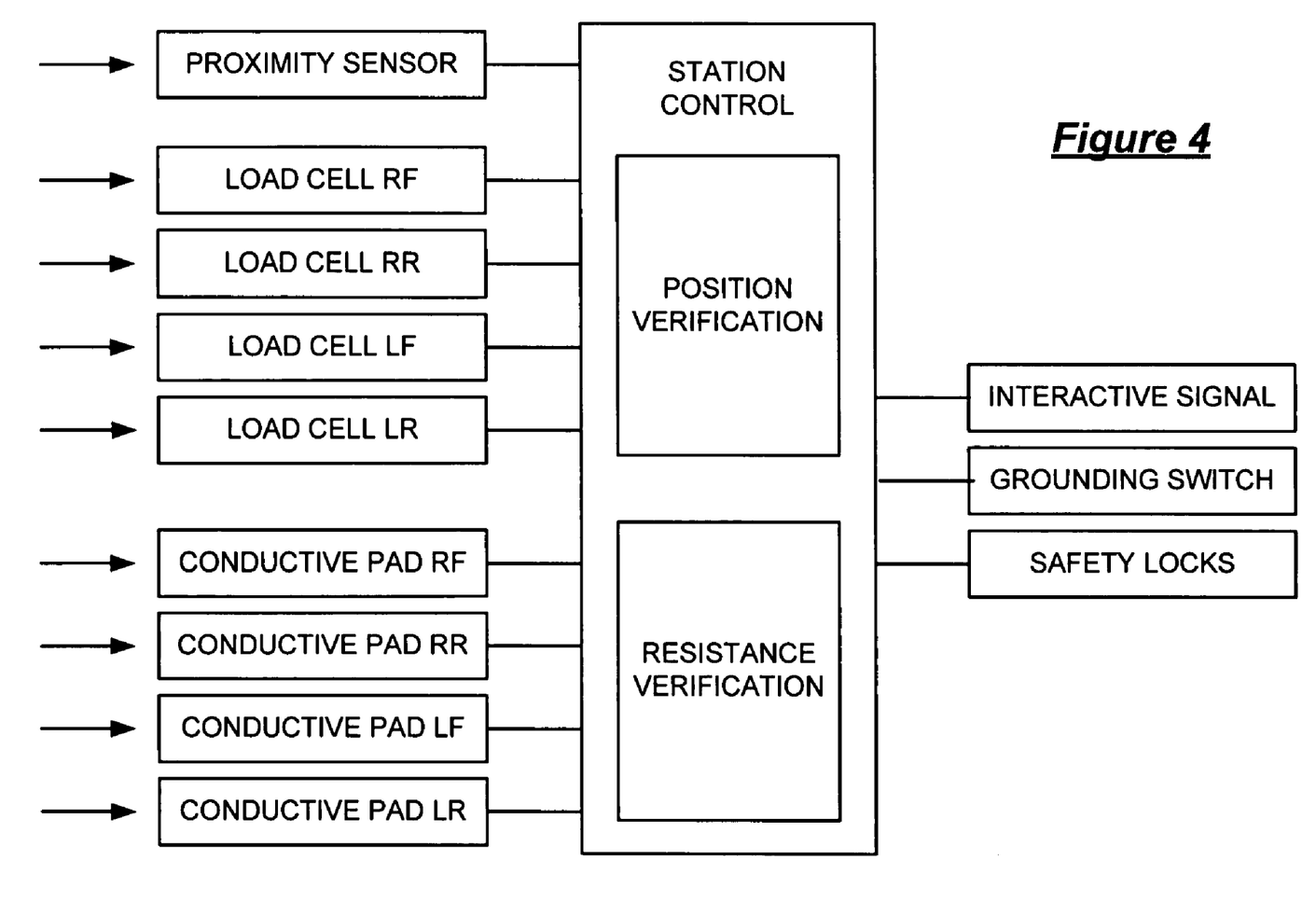
FIG. 4 shows an example of a control means linked to the vehicle position and resistance monitoring sensors interconnected with signal means and safety interlock[s].

In this example of the system shown in FIG. 2A, FIG. 2B and FIG. 2C, the conductive pads in contact with the tires, the proximity sensor[s] and load cells are interconnected with a control means such as shown in FIG. 4 that monitors aspects of the system operation and controls the signal for driver interactivity and fuel depot safety interlocks. In operation, the proximity beam 35B between sensors/transmitters 35 will detect when the vehicle is positioned correctly; the load cells 41LF and 41LR [and 41 RF and 42RR, not shown] check vehicle weight to make sure vehicle tires are contacting the conducting surfaces 21LF, 23LR, 21RF, and 23RR of the pads. When the vehicle is properly positioned, a red light 31 signals the driver to "STOP CAR." The control means at the depot thereupon disconnects steel grates or pads. 21LF, 23LR, 21RF, and 23RR from ground and measures vehicle resistance, Rvehicle-i=RL-tire+RR-tire+Rbody, for all possible tire combinations, LF to LR, LF to RF, LF to RR, RF to RR, RR to LR, and LR to RF. After so measuring, the control means determines whether Rvehicle-i<Rthreshold for each combination and will thereupon reconnect the grates to ground. A blue light 32 shows "OK TO FILL;" a green light 33 indicates "FILL IS FINISHED."

EXAMPLE B

Figure 3A:
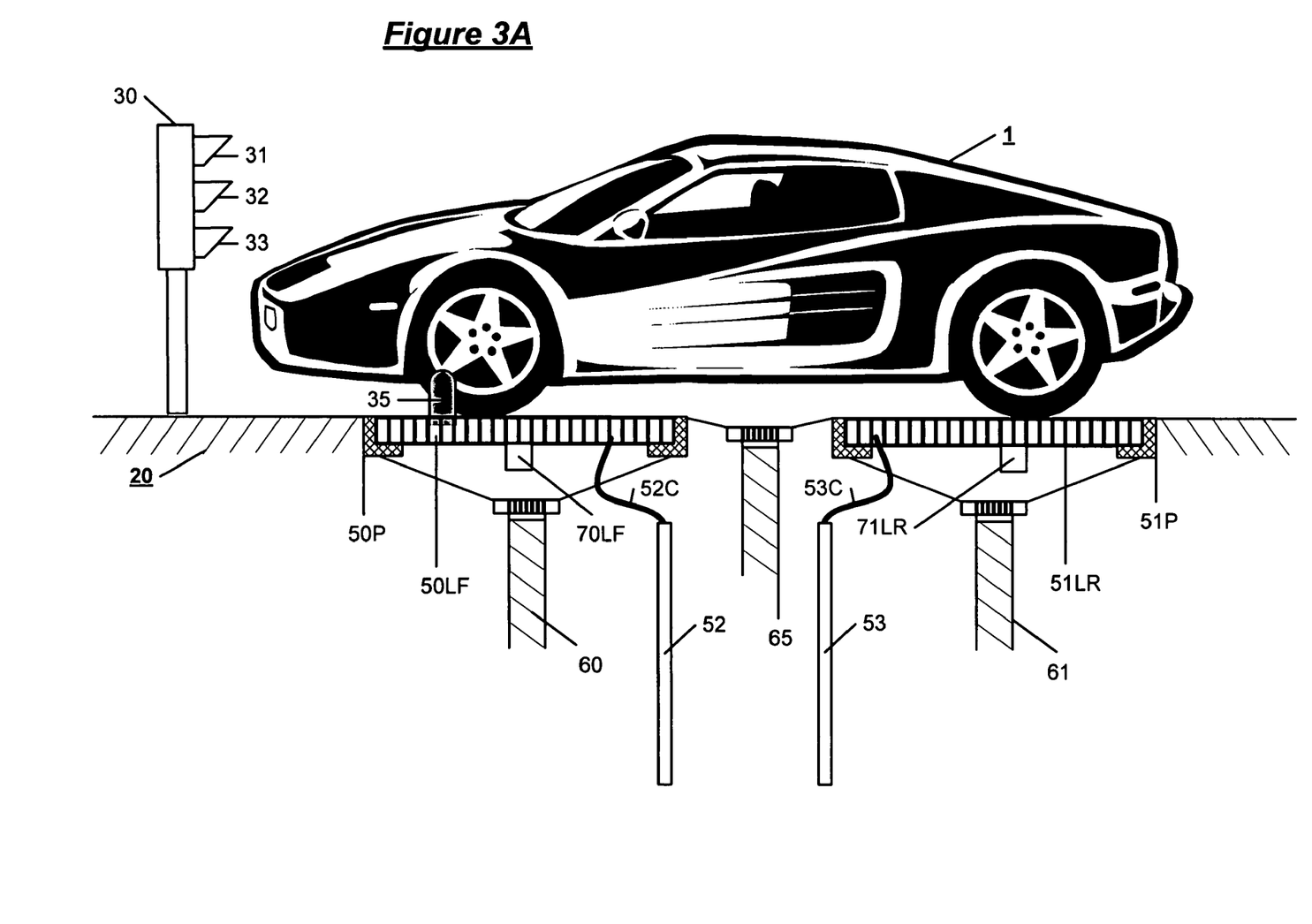
FIG. 3A is a side view of an alternative embodiment of the invention showing a vehicle positioned on conductive pads at a refuel depot and a signal to the driver for directing refuel operations.
Figure 3B:
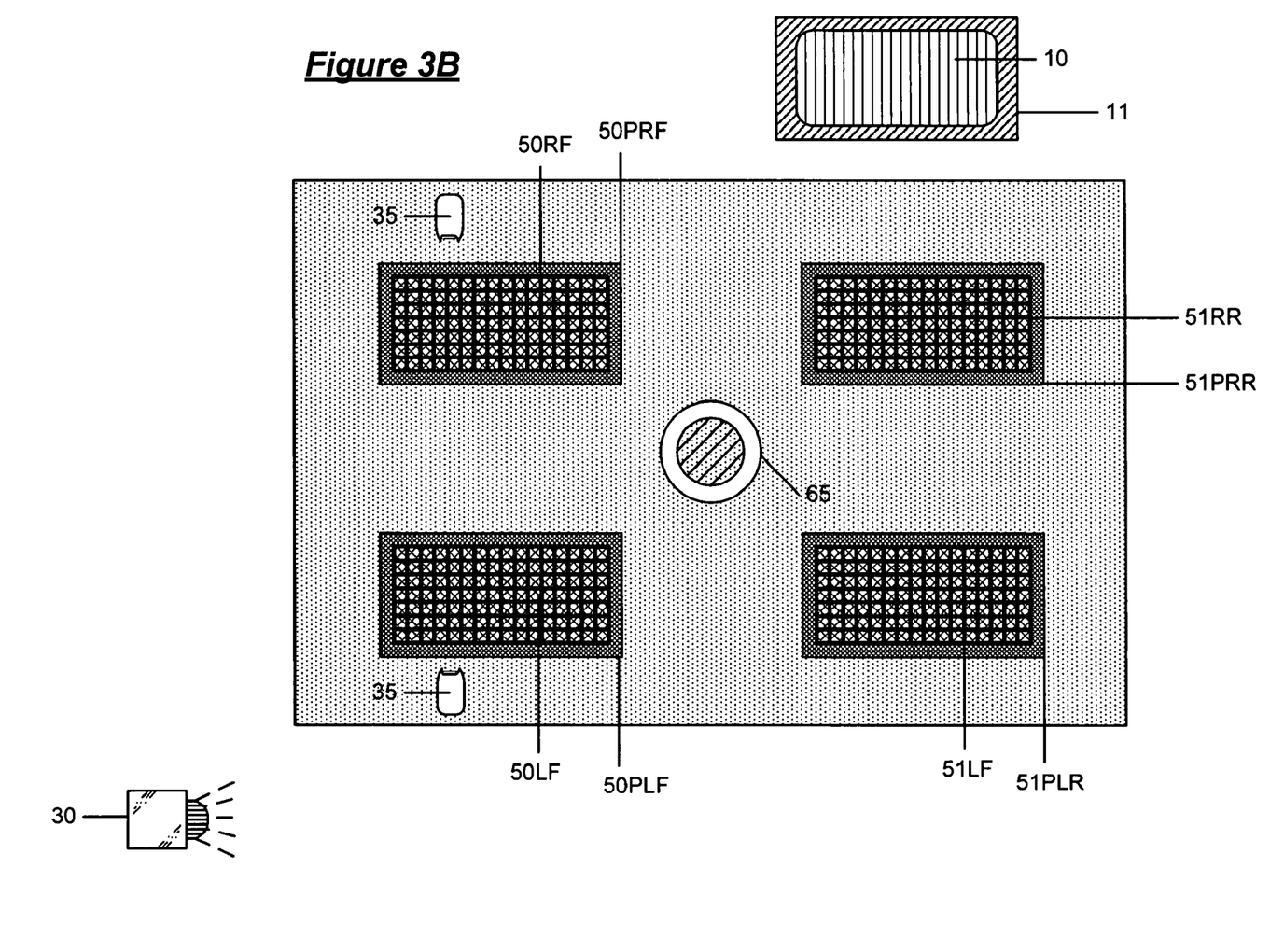
FIG. 3B is a plan view of the alternative embodiment of FIG. 3A.
Figure 3C:
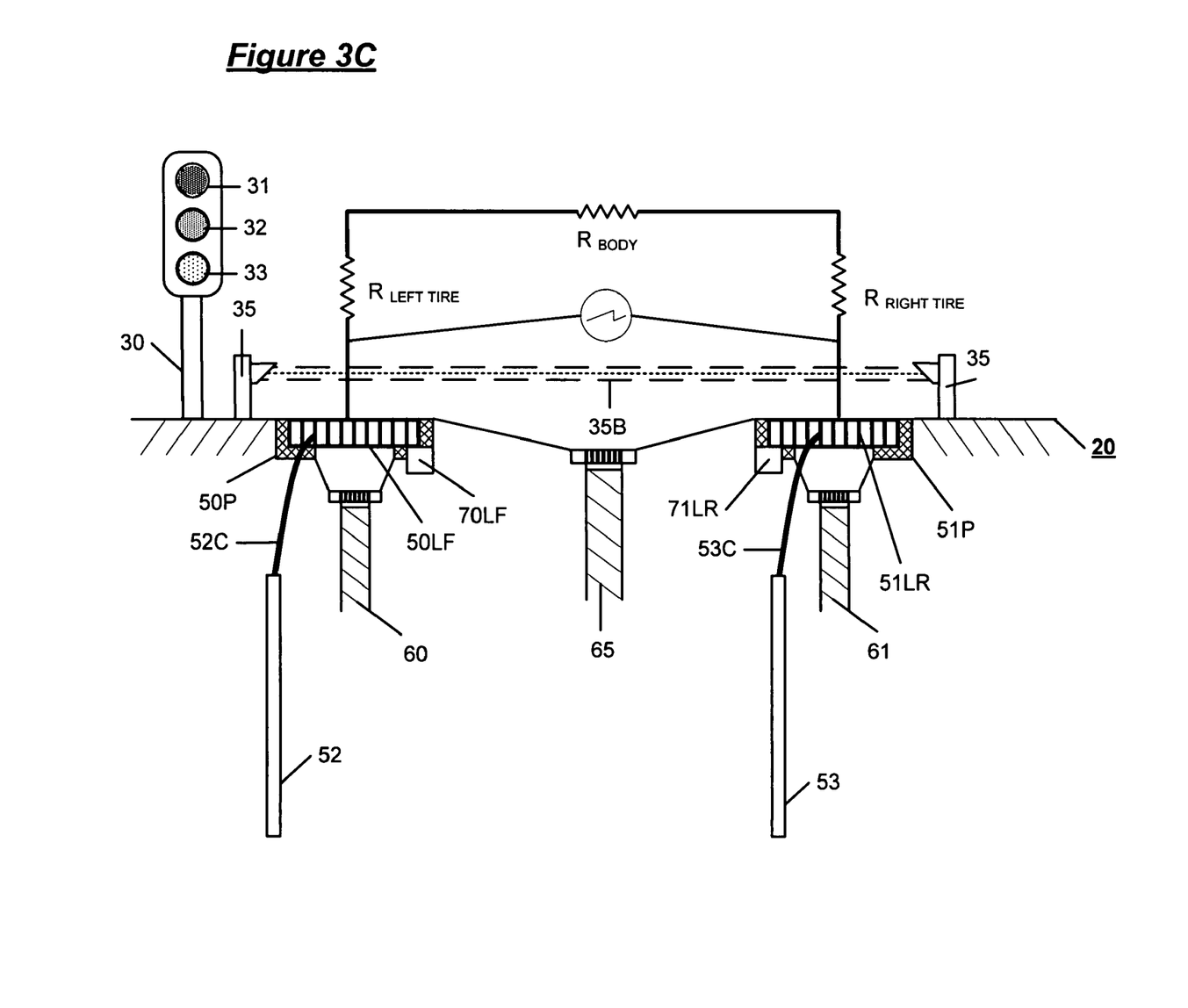
FIG. 3C is a cross section view of the embodiment of FIG. 3A showing operation of the resistance monitoring system when a vehicle is positioned correctly on the conductive pads.

FIG. 3A is a driver's [left] side view of an alternative embodiment of the invention showing a vehicle positioned on conductive pads at a refuel depot and a signal 30 to the driver for directing refuel operations. FIG. 3B is a plan view of the embodiment of FIG. 3A showing the four conductive grates signal and fuel pump. FIG. 3C is a cross section view of the embodiment of FIG. 3A showing operation of the resistance monitoring and driver signaling system when a vehicle is positioned correctly on the conductive pads. The conductive grates in Example B are differentiated from the conductive pads in Example A by their ability to allow dirt, mud, snow, and other environmental contaminants to fall through, leaving the contact surface with tires clean.

FIG. 3A shows vehicle 1 with the driver's side [left] shown positioned on conductive grates 50LF and 51LR at a refuel depot wherein ground or station platform is shown as 20. The signal 30 to the driver for directing refuel operations includes a series of differently colored lights, or text signals, for example: red light 31 indicating "STOP CAR;" blue light 32 showing "OK TO FILL," and green light 33 indicating "FILL IS FINISHED." Conductive grates 50LF and 51LR are positioned in the ground 20 and include on their perimeter boundary sides an insulating media 50PLF and 51PLR. Grounding rods 52 and 53 ensure a direct ground connection from the conductive grates. Water drains 60, 61 and 65 eliminate extraneous water from the system; and proximity sensor 35 verifies correct positioning of the vehicle on the pads which also include load cells 71LF and 72LR at the pads.

FIG. 3B is a plan view of the embodiment of FIG. 3A wherein the configuration of pads and isolative media on the right side of the vehicle, 50RF and 51RR and 50PRF and 51PRR is a symmetrical image of the left side shown in FIG. 3A. Drains 60, 61 and 65, proximity sensors 35, and refill pump 10 and platform 11, are also shown. Each pad may have its own grounding rod or multiple pads may utilize the same ground connection. FIG. 3C is a cross section view of the embodiment of FIG. 3A at the front of a vehicle showing operation of the resistance monitoring system when a vehicle is positioned correctly on the conductive pads. In this example of the system shown in FIG. 3A, FIG. 3B and FIG. 3C, the conductive pads in contact with the tires, the proximity sensor[s] and load cells are likewise interconnected with a control means such as shown in FIG. 4 that monitors aspects of the system operation and controls the signal for driver interactivity and fuel depot safety interlocks. In the operation of the embodiment, the proximity beam indicates when vehicle is positioned correctly; the load cells check vehicle weight to verify that the vehicle tires are contacting the conductive grates. Upon verification of correct position and contact, a red light 31 signals driver to "STOP CAR" whereupon the station control means will disconnect the steel grates from ground and measure the vehicle resistance: Rvehicle-i=RL-tire+RR-tire+Rbody. Resistance is measured for all possible tire combinations, LF to LR, LF to RF, LF to RR, RF to RR, RR to LR, and LR to RF. After so measuring, the control means determines whether: Rvehicle-i<Rthreshold for each combination and will thereupon reconnect the grates to ground. A blue light 32 shows "OK TO FILL;" a green light 33 indicates "FILL IS FINISHED."

As shown in FIG. 4 describing the control system applicable to the embodiments, data from the proximity sensor[s] and load cells RF, RR, LF and LR is input into the station control system to verify vehicle position and direct the operation of the interactive signal to inform the driver when the vehicle is in a correct position on the station pads. Data from the conductive pads RF, RR, LF and LR are input into a processing unit wherein the calculations of the examples are undertaken and the interactive signal indicates that a refill is allowed. As used herein the terminology RF, RR, LF and LR indicates respectively "Right Front," "Right Rear," "Left Front," and "Left Rear" with respect to identifications used with reference to the pads and other sensor and component positions with respect to the vehicle orientation.

If the resistance conditions are not met, then the station would have a grounding cable and the light pole and/or dispenser interface screen would tell the driver to connect the grounding cable to the vehicle. The driver would then confirm to the station that the grounding connector is connected, such as by pushing a button or touch screen or other means, or by an automatic verification. Thereupon, the station would verify the grounding connection, in an example, by measuring the resistance between the grounding cable and one or more of the conductive pads that the vehicle tires sit upon, or by some other method of confirming a ground connection to the vehicle via the cable. At this point, the station would signal the user that a safe condition exists to allow fill.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A driver interactive system to ensure that the static charge on a hydrogen fueled vehicle dissipates to a safe level before refueling comprising:
   a conductive tire contact surface directly connected to ground at the vehicle refueling depot;
   means for monitoring the position of the vehicle on the conductive surface to ensure that the vehicle is positioned correctly on the conductive surface before and during the refill process;
   means for measuring the resistance between the vehicle and ground to ensure that the vehicle/ground resistance is below a predetermined threshold safety value; and
   a signal for communicating with the vehicle driver that when the vehicle is positioned correctly and preconditions for the elimination of the possibility of an electric discharge are met, a safe condition exists whereby the vehicle may be refueled.

2. The system of claim 1 wherein the conductive surface comprises an array of conductive pads aligned to correspond to a predetermined vehicle tire configuration.

3. The system of claim 2 wherein the conductive pads are electrically switchable by a control means to an electrical ground.

4. The system of claim 2 wherein the electrical ground is earth.

5. The system of claim 3 wherein the electrical ground is earth.

6. The system of claim 3 wherein when the vehicle is positioned correctly on the pads, the control means a) disconnects the pads from ground; b) measures the vehicle resistance accordance to the formula Rvehicle-i=RL-tire+RR-tire+Rbody for all possible combinations of pads; and c) determines whether Rvehicle-i<Rthreshold for each combination, whereupon if Rvehicle-i<Rthreshold for each combination, the control means will reconnect the pads to ground and allow refill to proceed.

7. The system of claim 6 wherein the pad configuration includes "Right Front," "Right Rear," "Left Front," and "Left Rear" with respect to the vehicle orientation.

8. The system of claim 2 wherein at least one pad includes a load cell interconnected with the control means to verify to the control means that the vehicle is positioned upon the pad.

9. The system of claim 2 including a proximity sensor interconnected with the control means to verify to the control means that the vehicle is positioned upon the pad, and provides a signal to the driver to stop the vehicle at this position.

10. The system of claim 2 wherein at least one pad comprises a conductive grate interconnected with the control means, the grate being insulated from ground on its perimeter and bottom sides by an insulating material and being switchable to a ground status by the control means.

11. The system of claim 2 wherein at least one pad comprises a conductive grate interconnected with the control means, the grate being insulated from ground on its perimeter sides and a portion of its bottom an insulating material and being switchable to a ground status by the control means.

12. The system of claim 11 wherein the pad includes a water drain extending from the portion of the bottom of the grate not insulated by the insulating material.

13. The system of claim 1 including a backup grounding cable for connection to the vehicle, wherein if the resistance measurement for a safe condition is not met, a signal informs the driver to connect the grounding cable to the vehicle, whereupon, upon verification of the connection of the cable, the station signals the driver that a safe condition exists.

14. The system of claim 13 wherein, upon connection of the grounding cable, the resistance between the grounding cable and the conductive tire contact surface is measured to confirm a ground connection to the vehicle.

* * * * *